Sept. 22, 1953      C. O. CARLSON      2,653,295
APPARATUS FOR MEASURING PRESSURES AND PRESSURE VARIATIONS
Filed June 1, 1948
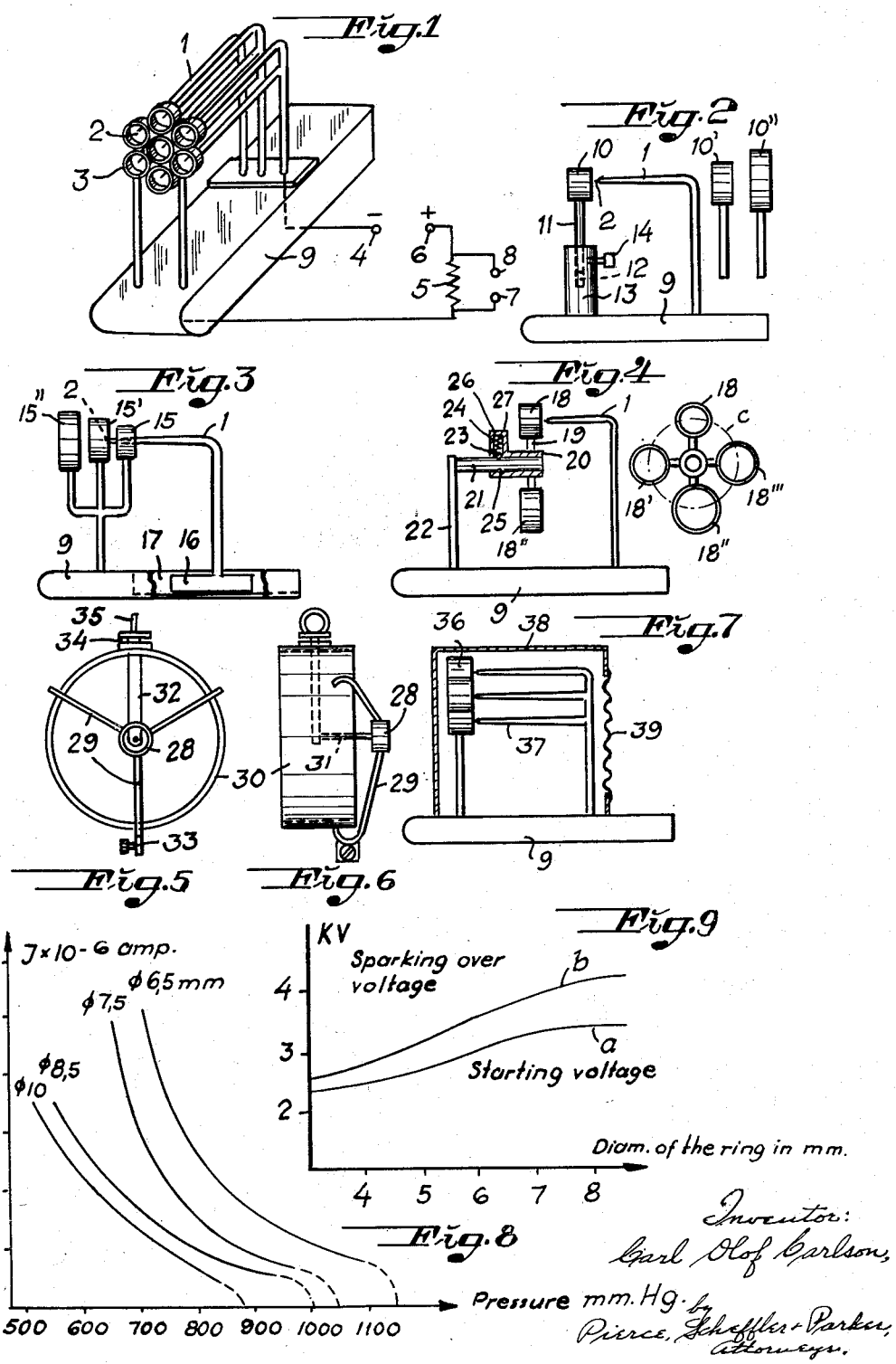

Patented Sept. 22, 1953

2,653,295

UNITED STATES PATENT OFFICE 2,653,295

APPARATUS FOR MEASURING PRESSURES AND PRESSURE VARIATIONS

Carl Olof Carlson, Stockholm, Sweden

Application June 1, 1948, Serial No. 30,338
In Sweden June 3, 1947

7 Claims. (Cl. 324—33)

This invention relates to measuring pressures and pressure variations and to an apparatus for this purpose. One object of the invention is to obtain an inertialess measuring or recording of pressures and quick pressure variations. Another object is to obtain a measuring or recording of pressure variations independent of the frequency of the variations. A further object is to provide an apparatus for measuring of a static pressure independent of any dynamic pressure or pressure variations appearing at the same time. Yet a further object is to provide an apparatus for measuring pressures affording great indications for relatively small pressure differences so that any amplification is not necessary.

The invention is based on the known fact that the strength of a current caused by a corona between two electrodes in a gaseous medium is dependent on the pressure of said medium so that the strength of said current decreases with an increasing pressure.

Other objects and advantages will appear from the following description and drawing.

In the drawing, which illustrates embodiments of the invention and wherein like reference characters indicate like parts.

Fig. 1 is a perspective view of an electrode arrangement in one embodiment of the invention, the elctrical connections thereto being shown diagrammatically;

Figs. 2–4 are side elevations of the electrode arrangements in three further embodiments of the invention;

Fig. 5 is a front elevation of the electrode arrangement in still another embodiment;

Fig. 6 is a side elevation thereof;

Fig. 7 is a side elevation of the electrode arrangement in yet another embodiment, a casing for the electrodes being shown in section;

Fig. 8 is a diagram showing the relation between current caused by a corona and pressure between an electrode formed with a point and other electrodes formed as rings having different diameter; and Fig. 9 is a diagram showing the relation between applied voltage and the diameter of the ring electrode.

In order to obtain a uniform corona between two electrodes, preferably one of the electrodes is formed with a point and the other as a ring, the point extending somewhat into the ring and extending in the centre line of the ring. The length of the ring ought not to be too great as then the risk arises that the air column in the ring starts oscillating but the ring should be of such a length and be arranged in such a manner that a corona discharge from the point will be substantially completely intercepted by the ring. A corona between two electrodes of the kind as just mentioned will appear at a field intensity of about 10 kv./cm. and if the diameter of the ring is 6 mm. the voltage to be applied between the electrodes is about 3 kv. at atmospheric pressure. In Fig. 9 the relation between the starting voltage for a corona between a point electrode and a ring electrode and the diameter of the ring is represented by the curve $a$. The other curve $b$ shows the voltage at which the corona changes into a sparking over and this voltage must not be exceeded. It will appear from the curves $a$ and $b$ that the diameter should not be chosen too small as then the measuring range will be very restricted because the starting voltage approaches the sparking over voltage. On the other hand, the sensitivity of the measuring decreases when the diameter of the ring increases, as will be seen from Fig. 8 which shows the relation between the corona current and the pressure when the applied voltage is constant. The curves represent this relation for different diameters varying from 6.5 mm. to 10 mm. as is set forth adjacent the curves. It will also be seen from these curves that different ring diameters are to be used for different measuring ranges.

It may be advantageous to connect a number of pairs of electrodes in parallel for the purpose of getting a stronger corona current. An embodiment of an apparatus according to the invention which is provided with seven pairs of electrodes connected in parallel, is shown in Fig. 1. In each pair one electrode 1 is formed with a point 2 of a hard refractory metal resistant to sputtering, such as platinum, while the other electrode has the form of a ring 3 concentrically arranged around the corresponding point electrode. All the point electrodes are joined and connected with a terminal 4 to which the negative pole of a source of a high direct voltage is to be applied, while the ring electrodes are connected with the one terminal of a resistance 5 of which the other end is connected with a terminal 6 with which the positive pole of said source of high voltage is joined. To the terminals 7 and 8 joined with the ends of the resistance 5 there is to be connected an indication instrument. When quick pressure variations are to be measured, for instance pressure variations due to explosions, preferably a cathode ray oscillograph is used as indication instrument. In such a case one pair of deflector plates in the cathode ray tube is connected to the terminals 7 and 8. The electrodes 1 and 2 are firmly attached to a base plate 9 of insulating material. The base plate 9 provided with the electrodes is mounted at the place where pressures are to be measured and the electrods ar connected as set forth above. Naturaly, a calibration must be carried out beforehand or afterwards by measuring known pressures.

In Fig. 2 there is shown an embodiment provided with one pair of electrodes only. However, the ring electrode 10 may be exchanged for two other ring electrodes 10' and 10" of different diameters. For this purpose each ring electrode is provided with a shaft 11 which may be placed into a bore 12 in a post 13 attached to the base plate 9. The electrode may be fixed in correct height position opposite to the electrode point 2 by means of a set screw 14. By interchanging the electrodes 10, 10' and 10" the electrode arrangement may be adjusted for different measuring ranges.

Figs. 3 and 4 represent further embodiments of electrode arrangements provided with one point electrode and several ring electrodes. According to Fig. 3 three ring electrodes 15, 15' and 15" of different diameter are connected to and mounted on the base plate 9 in such a way that their centres lie in the same line. The point electrode 1 having the point 2 extends in the same line and is mounted on a foot 16 displaceable in a longitudinal nut 17 in the base plate 9. By displacement of the electrode 2 it may be adjusted for co-operation with any one of the ring electrodes 15, 15' and 15". Instead of the point electrode 1, of course, the aggregate of ring electrodes may be movable. In Fig. 4 the ring electrodes 18, 18', 18" and 18''' of different diameter are attached by means of spokes 19 to a sleeve 20 turnable on a horizontal shaft 21 which, in turn, is supported by a post 22 mounted on the base plate 9. By turning said sleeve 20 the individual rings may be arranged opposite to the point 2 of the electrode. The centres of the rings lie on the same circle c, as will be seen from the front view of the ring arrangement shown to the right in Fig. 4 so that in position for co-operation with the point electrode the corresponding ring always is concentrically arranged relative the point 2. The ring electrodes are fixed in the co-operation positions by means of a ball 23 actuated by a spring 24 for engaging notches 25 in the shaft 21. The ball and the spring are arranged in a bore 26 in a lateral extension 27 of the sleeve 20.

The embodiment illustrated in Figs. 5 and 6 is adapted to be hung up freely. Here the ring electrode 28 is attached by means of three arms 29 to a larger ring 30 of insulating material to which the point electrode 31 is also secured by means of an arm 32. The arms 29 and the arm 32 are made of conducting material and one of the former is provided with a connecting screw 33 while the arm 32 outside the insulating ring 30 is formed with a connecting terminal 34 and with an eye 35 for suspending the aggregate.

In Fig. 7 three pairs of electrodes connected in parallel and comprising ring electrodes 36 and point electrodes 37 are mounted on a base plate 9 and enclosed in a gas-tight casing 38, a portion 39 of which yielding to pressure variations so that these are propagated into the casing. This embodiment may be used for measuring of pressure waves in water, inflammable gases or the like.

In some cases it may be more convenient to use several pairs of electrodes connected in parallel and formed and arranged for measuring within different measuring ranges and to provide these pairs in such a way that they may be cut out at will. If the apparatus is provided with more than one pair of electrodes it will be appropriate to provide the high voltage circuit with a voltage control means having several stages each being adjusted for producing a suitable potential difference between the corresponding pair of electrodes. Thus, it may be easy to adapt the apparatus according to the invention for measuring pressures of varying magnitude and for different measuring ranges and also for a desired sensitivity. An advantage of the apparatus according to the invention is also that the portion subjected to the pressures to be measured may have very small size. Besides for recording air waves at explosions, the apparatus according to the invention may also be used for other purposes, for instance as microphone for sound recording and for measuring of pressure variations in air streams and as a barometer. Also pressure variations in gases of a high temperature may be recorded, for instance in combustion engines.

What I claim is:

1. An apparatus for measuring pressures and pressure variations comprising a pair of electrodes, one of said electrodes terminating in a point and the other being a ring electrode concentrically surrounding the point end of the first electrode, a high voltage source for applying a potential difference of preselected constant magnitude between said electrodes to produce a corona therebetween, and an instrument in series with said pairs of electrodes for measuring the current between said electrodes caused by said corona.

2. An apparatus for measuring pressures and pressure variations comprising a pair of electrodes, one of said electrodes being formed with at least one point and the other as a ring concentrically arranged around said point, a high voltage source for applying a potential difference of preselected constant magnitude between said electrodes to produce a corona therebetween, and an instrument in series with said pairs of electrodes for indication of the current between said electrodes caused by said corona.

3. An apparatus for measuring pressures and pressure variations comprising at least one pair of electrodes, one of said electrodes of a pair being formed with at least one point and the other as a ring concentrically arranged around said point, said electrodes of a pair being adjustably arranged with respect to each other, a high voltage source for applying a potential difference of preselected constant magnitude between said electrodes to produce a corona therebetween, and an instrument in series with said pairs of electrodes for measuring the magnitude of the current between said electrodes caused by said corona.

4. An apparatus for measuring pressures and pressure variations comprising an electrode formed with a point, a number of ring electrodes having different diameters, means supporting said ring electrodes for movement of a desired one thereof into cooperative relation to said point electrode; a high voltage source for applying a potential difference of preselected constant magnitude between said point electrode and the ring electrode in cooperative relation thereto to produce a corona therebetween, and an instrument in series with said point electrode and said ring electrodes for indication of the current between said electrodes caused by said corona.

5. An apparatus for measuring pressures and pressure variations comprising a number of pairs of electrodes, each pair comprising a point electrode and a concentrically arranged ring electrode, a gas-tight casing enclosing said pairs of electrodes, a portion of said casing being yielding to pressure variations, a high voltage source for applying a potential difference of preselected constant magnitude between said electrodes to produce a corona therebetween, and an instrument in series with said high voltage source and said electrodes for indication of the current between said electrodes caused by said corona.

6. An apparatus for measuring pressures and pressure variations comprising a number of pairs of electrodes, each pair comprising a point electrode and a concentrically arranged ring electrode, said pairs being electrically connected in parallel, a high voltage source for applying a potential difference of preselected constant magnitude between the electrodes in said pairs to produce a corona therebetween, and an instrument in series with said high voltage source and said electrodes for measuring the current between said electrodes caused by said corona.

7. An apparatus for measuring pressures and pressure variations comprising a number of pairs of electrodes which are formed and arranged for measuring within different measuring ranges, each pair comprising a point electrode and a concentrically arranged ring electrode, said pairs being connected in parallel, means for cutting out any one of said pairs, a high voltage source for applying a potential difference of preselected constant magnitude between the electrodes in said pairs to produce a corona therebetween, and an instrument in series with said high voltage source and said electrodes for measuring the magnitude of the current between said electrodes caused by said corona.

CARL OLOF CARLSON.

References Cited in the file of this patent

UNITED STATES PATENTS

| Number | Name | Date |
|---|---|---|
| 1,548,074 | Waite | Aug. 4, 1925 |
| 1,697,339 | Baker | Jan. 1, 1929 |
| 2,378,226 | Lee | June 12, 1945 |

OTHER REFERENCES

"The Corona Voltmeter and the Electric Strength of Air" by Whitehead and Isshiki, Journal of the American Institute of Electrical Engineers, vol. 39 (1920), pp. 441-444.